(12) United States Patent
Dovel (10) Patent No.: US 7,641,202 B1
(45) Date of Patent: Jan. 5, 2010

(54) END EFFECTOR WITH MOVEABLE JAW ASSEMBLY TO MANIPULATE AN ARTICLE

(75) Inventor: Daniel T. Dovel, Shady Cove, OR (US)

(73) Assignee: Professional Tool Manufacturing, LLC, Ashland, OR (US)

( * ) Notice: Subject to any disclaimer, the term of this patent is extended or adjusted under 35 U.S.C. 154(b) by 477 days.

(21) Appl. No.: 11/244,470

(22) Filed: Oct. 6, 2005

(51) Int. Cl.
*B23B 31/167* (2006.01)

(52) U.S. Cl. ............................ 279/58; 279/60; 279/64; 269/233

(58) Field of Classification Search .................. 279/55, 279/58, 60, 64, 65; 269/216, 221, 229, 233; *B23B 31/167, B23B 31/171*
See application file for complete search history.

(56) References Cited

U.S. PATENT DOCUMENTS

| | | | | |
|---|---|---|---|---|
| 324,139 | A | * | 8/1885 | McKaig, E.T. ............... 279/64 |
| 635,458 | A | * | 10/1899 | Albert ........................ 279/64 |
| 1,568,869 | A | * | 1/1926 | Boes .......................... 279/64 |
| 1,583,554 | A | * | 5/1926 | Hoover ...................... 81/53.2 |
| 1,665,250 | A | * | 4/1928 | Atkins ........................ 279/58 |
| 1,930,022 | A | * | 10/1933 | Tautz .......................... 279/58 |
| 4,001,975 | A | | 1/1977 | Bernard et al. |
| 4,031,672 | A | | 6/1977 | Moores, Jr. et al. |
| 4,088,333 | A | * | 5/1978 | Nobile et al. ................. 279/60 |
| 4,176,499 | A | | 12/1979 | Mazoff |
| 4,455,786 | A | | 6/1984 | Maysilles |
| 4,485,596 | A | | 12/1984 | Bernard et al. |
| 4,520,599 | A | | 6/1985 | Slinsky |
| 4,642,942 | A | | 2/1987 | Guhring |
| 4,646,474 | A | | 3/1987 | Chen |
| 4,658,549 | A | | 4/1987 | Lockwood |
| 4,916,867 | A | | 4/1990 | Lockwood |
| 4,974,372 | A | | 12/1990 | Chantalat |
| 5,400,546 | A | | 3/1995 | Christian et al. |
| 5,788,559 | A | | 8/1998 | Jungnitsch |
| 6,110,018 | A | | 8/2000 | Hepworth |
| 6,244,938 | B1 | | 6/2001 | Ploeger |
| 6,652,367 | B1 | | 11/2003 | Lin |
| 6,676,494 | B1 | | 1/2004 | Ching |

FOREIGN PATENT DOCUMENTS

WO    WO 2004/028742    4/2004

* cited by examiner

*Primary Examiner*—Eric A Gates
(74) *Attorney, Agent, or Firm*—Fellers, Snider, et al.

(57) ABSTRACT

Apparatus for manipulating an article, such as a cutting tool. A moveable jaw member includes first and second inclined surfaces, with the second inclined surface being substantially parallel to the first inclined surface and non-parallel to a central axis. A support structure provides stationary first and second guide surfaces along which the respective first and second inclined surfaces contactingly move. This maintains the jaw member in a selected angular alignment with the central axis as the jaw member advances in a direction orthogonal to the central axis to engage a side of the article. A second jaw member is preferably provided so that the article is clamped between the first and second jaw members. A spring preferably biases the jaw members apart and resists inward movement thereof. A base surface advances along the central axis to contactingly advance and retract the jaw member(s).

18 Claims, 5 Drawing Sheets

END EFFECTOR WITH MOVEABLE JAW ASSEMBLY TO MANIPULATE AN ARTICLE

FIELD OF THE INVENTION

The claimed invention relates generally to the field of end effectors and more particularly, but not by way of limitation, to an end effector with a moveable jaw assembly to manipulate an article, such as a cutting tool.

BACKGROUND

End effectors are used in a wide variety of applications to manipulate articles. Such end effectors can be disposed at a distal end of a robotic arm, or can be incorporated into a manual or semi-manual actuated system, such as a chuck used to position a cutting tool during a sharpening operation.

By way of example, U.S. Pat. No. 5,735,732, issued to Bernard and assigned to the assignee of the present application, generally discloses a drill bit sharpener that utilizes a chuck to hold a drill bit for sharpening. The chuck and bit are inserted by the user into an alignment port to set various geometries of the bit with respect to the chuck, such as depth and angular orientation (timing angle).

Once aligned, the chuck and bit are inserted by the user into a sharpening port wherein the bit is presented to a rotating grinding wheel to sharpen the cutting surfaces of the bit. As the chuck is rotated by the user, camming surfaces on the chuck control the depth and angle of the bit during the sharpening process. As desired, the chuck and bit can further be inserted into a split-point port in order to provide a split-point on the bit by removing material between the respective cutting surfaces on the drill bit tip.

While operable, there remains a continual need for improvements in the manner in which articles such as cutting tools are precisely manipulated, and it is to such improvements that the claimed invention is generally directed.

SUMMARY OF THE INVENTION

Preferred embodiments of the present invention are generally directed to an apparatus for manipulating an article, such as a cutting tool.

A moveable jaw member preferably includes first and second inclined surfaces adjacent respective proximal and distal ends of the member. The second inclined surface is substantially parallel to the first inclined surface and non-parallel to a central axis.

A support structure preferably provides stationary first and second guide surfaces along which the respective first and second inclined surfaces contactingly move. This maintains the jaw member in a selected angular alignment with the central axis as the jaw member advances in a direction orthogonal to the central axis to engage a side of the article.

The jaw member further preferably comprises a clamping surface disposed between the first and second inclined surface to apply a substantially uniform clamping force against the side of the article when the jaw member engages the article.

A second jaw member is preferably provided so that the article is clamped between the first and second jaw members. A spring preferably biases the jaw members apart and resists inward movement thereof. A base surface of a housing member moves along the central axis to contactingly advance and retract the jaw member(s).

These and various other features and advantages which characterize the claimed invention will become apparent upon reading the following detailed description and upon reviewing the associated drawings.

DETAILED DESCRIPTION

Figure 1:
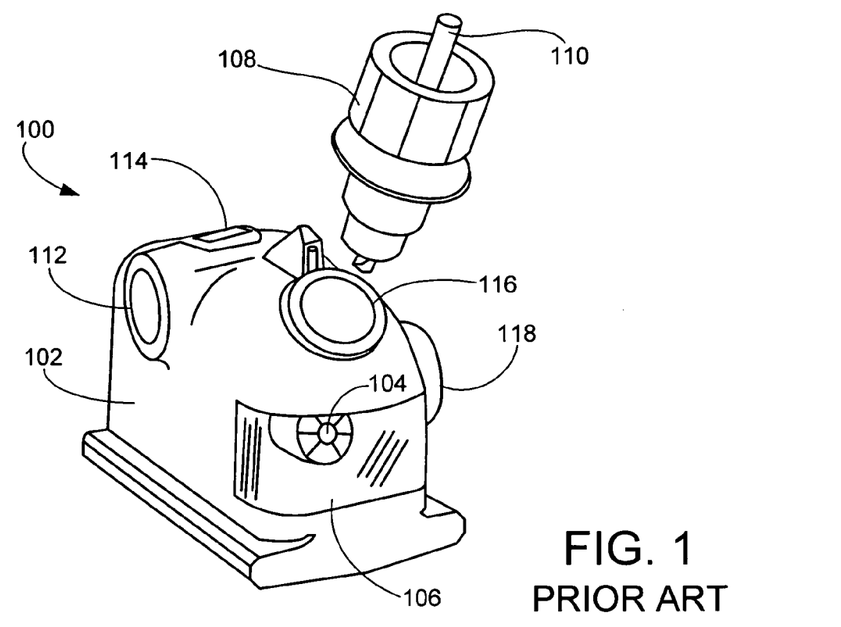
FIG. 1 is a perspective representation of a tool sharpener of the prior art.

FIG. 1 shows a simplified representation of a tool sharpener 100 constructed in accordance with the prior art. FIG. 1 has been provided in order to set forth useful background information, as well as to generally illustrate an exemplary environment in which preferred embodiments of the present invention can be advantageously practiced. Additional information with regard to the tool sharpener 100 of FIG. 1 can be found in the aforementioned Bernard U.S. Pat. No. 5,735,732 reference.

The tool sharpener 100 comprises a rigid housing 102 that encloses various components of interest, including a motor and an abrasive member 104. The abrasive member is characterized as a high speed grinding wheel, and is visible in FIG. 1 through a transparent window 106 in the housing 102.

Figure 2:
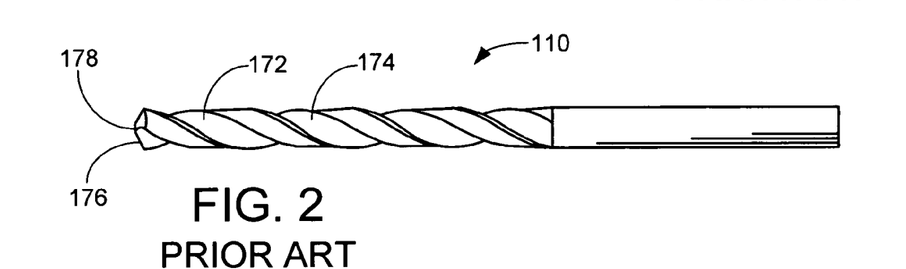
FIG. 2 shows a drill bit as an exemplary type of tool particularly suited for sharpening by the sharpener of FIG. 1, as well as by preferred embodiments of the present invention.

A chuck assembly 108, also characterized herein as an end effector, is adapted to secure a tool 110 during the sharpening process. The tool preferably comprises a conventional twist drill bit as shown in FIG. 2, although other types of tools can also be sharpened by the sharpener 100.

The chuck assembly 108 utilizes an internal collet arrangement to clamp the periphery of the tool 110. The collet arrangement is adjustable to accommodate different diameters of tools.

After the tool 110 is initially secured by the chuck assembly 108, the chuck assembly 108 and the tool 110 are inserted into an alignment port 112 of the housing 102. Generally, the alignment port operates to establish the appropriate angular orientation of the tool 110 (i.e., rotational or timing angle) with respect to the chuck assembly 108.

A pair of opposing pawl members within the port 112 are advanced to engage opposing sides of the cutting (proximal) end of the tool 110. As observed by the user via view port 114, the tool 110 is rotated by the user through manipulation of the distal end of the tool 110 until the pawl members reach a minimum separation distance against the opposing sides of the cutting end. The appropriate insertion depth of the tool 110 with respect to the chuck 108 is also preferably set during this operation. The collet arrangement is tightened to retain the tool 110 in this final orientation.

Next, the chuck assembly 108 and the tool 110 are removed from the alignment port 112 and inserted into a sharpening port 116 for presentation of the cutting end against the abrasive member 104. The user rotates the chuck assembly 108 to follow inbound and swing camming surfaces (not shown in particular detail in FIG. 1) to cause the tool 110 to follow an eccentric path during the sharpening operation. After a suitable number of rotations (e.g., six), the tool will typically be sufficiently sharpened, and the chuck assembly 108 and the tool 110 can be removed from the sharpening port 116.

As desired, the chuck assembly 108 and the tool 110 can be inserted into a split-point port 118. This again presents the cutting edge of the tool 110 to the abrasive member 104, albeit at a different orientation as compared to the sharpening port 116. The operation of the split-point port 118 serves to remove material from the tip of the tool (i.e., between the respective cutting surfaces) to provide a split-point.

Figure 3:
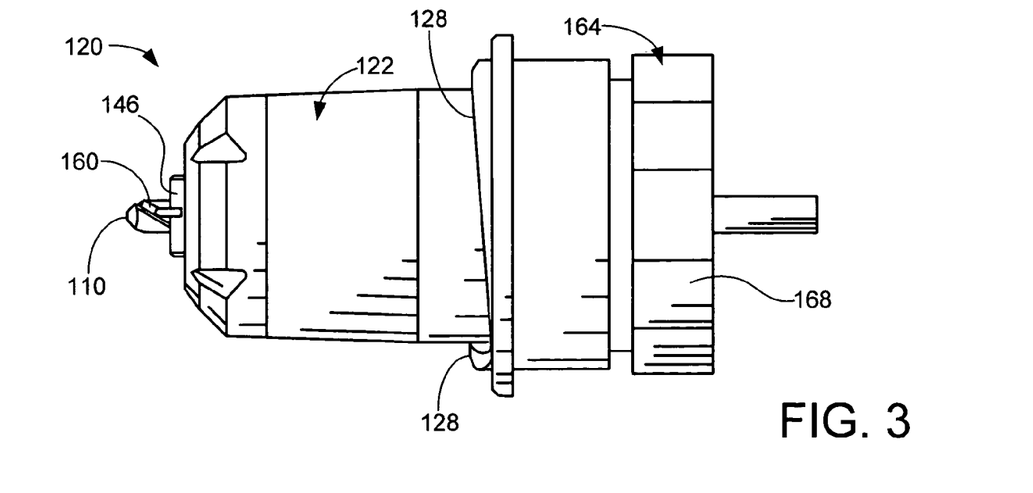
FIG. 3 is a side view of a chuck assembly constructed and operated in accordance with preferred embodiments of the present invention to align a tool such as the drill bit of FIG. 2 for sharpening against an abrasive member such as shown in FIG. 1.

FIG. 3 illustrates a chuck assembly 120 constructed and operated in accordance with preferred embodiments of the present invention. As will be discussed below in greater detail, the chuck assembly 120, also generally characterized herein as an end effector, advantageously permits presentation of the tool 110 for sharpening such as by, but not limited to, the use of the above described sharpening and point-splitting ports 116 and 118 of FIG. 1.

The chuck assembly 120 includes a first housing member 122. A preferred construction for the housing member 122 is set forth in FIG. 4, which shows a circumferentially extending side wall 124 that defines a central orifice through the member 122. A first opening 126 in the housing member 122 includes a series of internal threads. External camming surfaces 128 (best viewed in FIG. 3) extend from the side wall 124 to serve as limit stops and thereby guide the chuck assembly 120 during the sharpening operation, as described above.

The side wall 124 is preferably provided with a substantially annular interior surface 130. This annular surface 130 supports a guide plate 132. The plate 132 is preferably flat so as to extend across the surface 130 in a chord-like fashion. Although not shown in FIG. 4, the housing member 122 preferably includes two such plates 132 on opposing sides of a central reference axis of the member 122.

Figure 4:
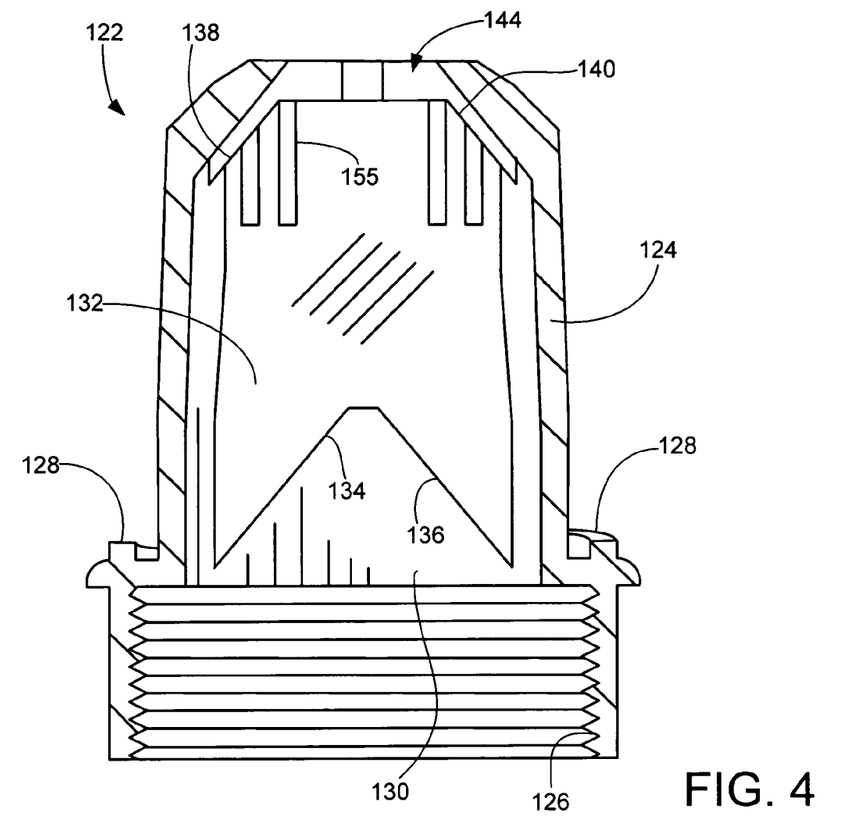
FIG. 4 provides a cross-sectional view of a housing member of the chuck assembly.

The plate 132 includes lower guide surfaces (edges) 134, 136 which are angled upwardly and inwardly as shown. The interior surface 130 similarly includes a pair of upper guide surfaces 138, 140 which are preferably parallel to the guide surfaces 134, 136. A second opening 144 of the housing member 122 opposite the first opening 126 is preferably rectangular in cross-sectional shape.

Figure 5:
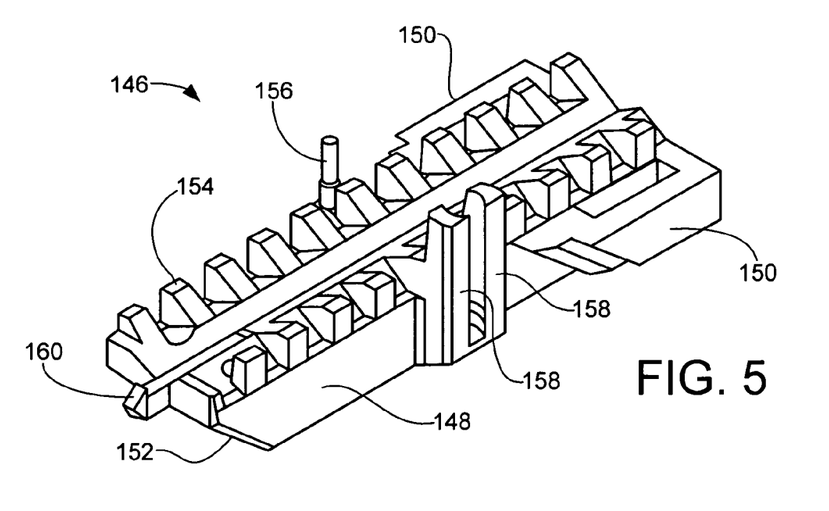
FIG. 5 provides an isometric view of a moveable jaw that cooperates with the housing member of FIG. 4 to advance the alignment finger and to engage a side of the drill bit.

A pair of opposing jaw members 146 are preferably disposed within the first housing member 122, one of which is shown in FIG. 5. The jaw member 146 includes a base 148 with opposing guide flanges 150 and tapered front surface 152. The flanges and front surface 152 cooperate with the respective guide surfaces 134, 136, 138 and 140 of FIG. 4 to advance the jaw member 146 inwardly and upwardly during operation. Ribs 155 (FIG. 4) preferably provide support to the respective sides of the jaw members 146 and help guide the jaw members 146 into the opening 144.

Two rows of opposing clamping fingers (one numerically denoted at 154) preferably project as shown from the base 148. The fingers 154 and base 148 form a generally v-shaped block. This allows the jaw member to contactingly engage a side of the tool 110 to align the tool 110 with a reference axis of the chuck assembly 120, and to accommodate different diameters of tools.

A cylindrical post 156 preferably extends from the base 148 to secure a first coiled spring (not shown in FIG. 5). A pair of spring retention arms 158 opposite the post 156 form a spring retention channel to accommodate a second coiled spring. The base 148 further preferably supports a rigid alignment finger 160, which projects from the base 148 to engage the cutting end of the tool 110.

Figure 6:
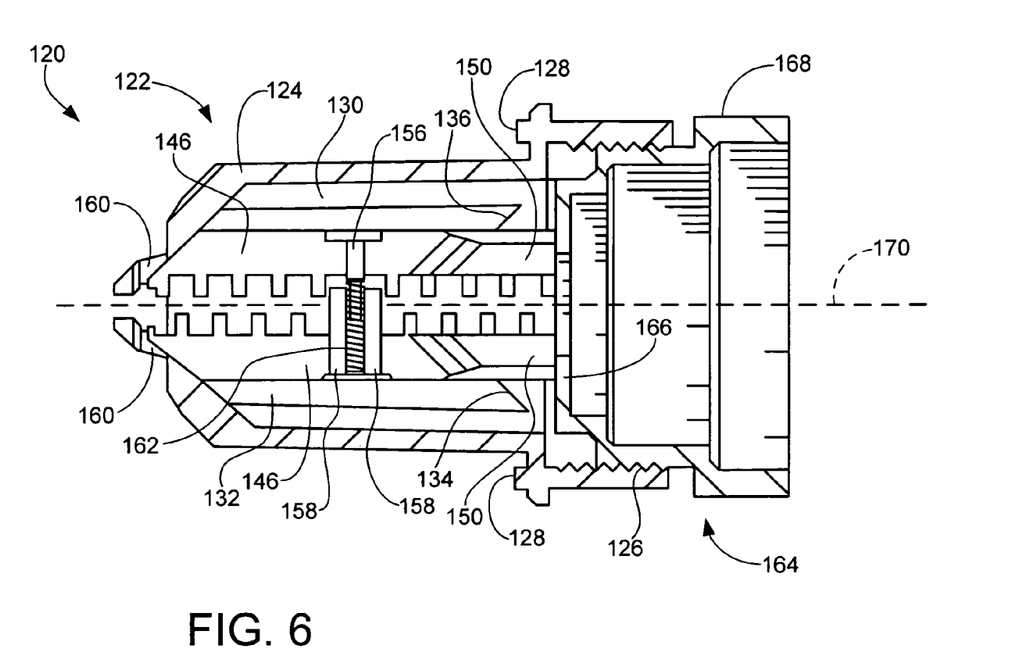
FIG. 6 provides a partial cross-sectional representation of a preferred construction for the chuck assembly of FIG. 3.

FIG. 6 shows one of the aforementioned first and second springs at 162. The remaining spring is behind the first one and thus, has been omitted to simplify the view. These springs 162 provide a bias force so that the jaw members 146 are nominally biased away from each other.

FIG. 6 further shows a second housing member 164 which is inserted into the first end 126 of the first housing member 122. The second housing member 164 includes an external set of threads to engage the threads of the first housing member 122. The housing member 164 further includes an interior base surface 166 which abuts the jaw members 146. An annular, external grip surface 168 of the housing member 164 is also provided (see FIG. 3).

User rotation of the second housing member 164 by way of the grip surface 168 causes threaded advancement of the second housing member 164 with respect to the first housing member 122. This advances the base surface 166 which, in turn, contactingly urges the jaw members 146 to slidingly advance upwardly and inwardly by tracked movement along the respective guide surfaces 134, 136, 138 and 140.

This movement of the jaw members 146 is in opposition to the biasing force from the springs 162, and the springs 162 maintain the jaw members 146 in contacting engagement against the base surface 166 irrespective of the separation distance between the jaw members. During operation, the second housing member 164 is preferably advanced until the respective jaw members 146 contactingly engage opposing sides of the tool 110. This securely clamps the tool 110 between the jaw members 146, as depicted by the partial cross-sectional view of FIG. 7.

Figure 8:
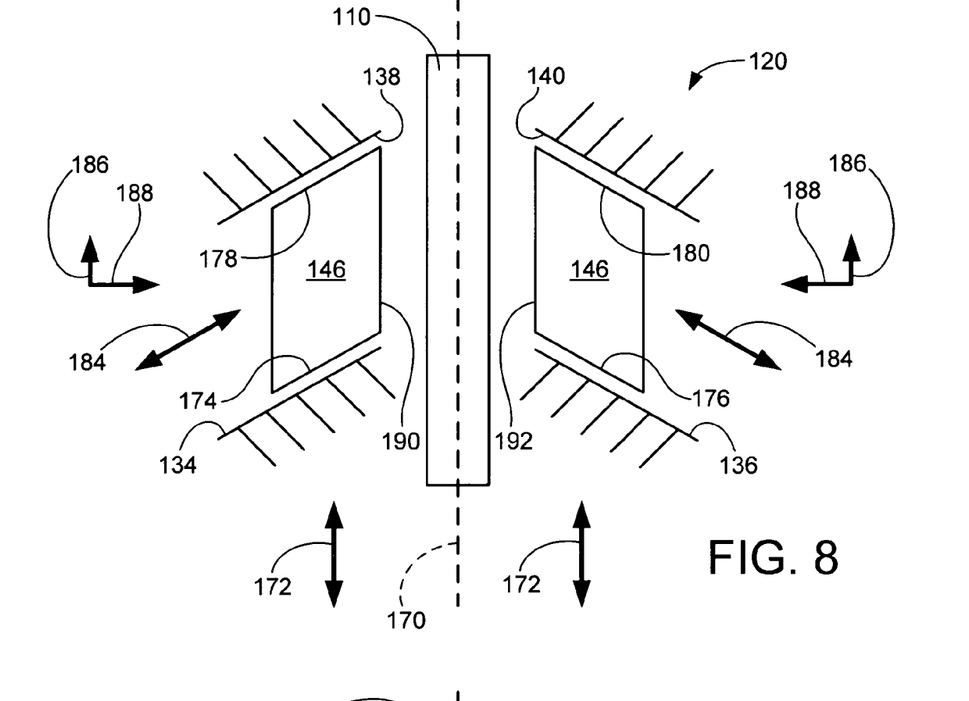
FIG. 8 provides a generalized schematic representation of relevant operation of the opposing moveable jaws FIGS. 6 and 7.

FIG. 8 provides a simplified schematic diagram to further illustrate the foregoing operation. A central alignment axis is depicted by broken line 170. Advancement of the base surface 166 provides a force (vectors 172) upon the respective jaw members 146 in a direction parallel to the central axis 170. This induces respective movement of the jaw members 146 along the guide surfaces 134, 136, 138 and 140. For simplicity of illustration, the respective orientations of the lower surfaces 134 and 136 are reversed in FIG. 8 as compared to FIGS. 4 and 6.

The jaw members 146 respectively include lower inclined surfaces 174, 176 and upper inclined surfaces 178, 180. Although gaps are shown in FIG. 8, preferably the lower inclined surface 174 is in sliding contact with the lower guide surface 134, the upper inclined surface 178 is in sliding contact with the upper guide surface 138, and so on.

The force 172 thus translates into movement of the jaw members 146 as the respective lower inclined surfaces 174, 176 slidingly advance along the lower guide surfaces 134, 136, and the respective upper inclined surfaces 178, 180 slidingly advance along the upper guide surfaces 138, 140. The directions of travel of the respective jaw members are denoted by vectors 184, each of which has a "vertical" component 186 and a "horizontal" component 188.

In this way, the jaw members 146 both generally advance in the direction of the base surface 166, as indicated by vertical component 186, and at the same time advance toward the central axis 170, as indicated by horizontal component 188. During this movement, the jaw members 146 are maintained in a constant angular orientation with respect to the central axis 170; in this case, parallel to the central axis 170, although such is not limiting.

As the jaw members 146 continue to be advanced, interior clamping surfaces 190, 192 of the jaw members engage the sides of the tool 110. Maintaining the angular orientation of the jaw members 146 parallel to the central axis 170 serves to maintain the clamping surfaces 190, 192 in the requisite orientation to securely clamp the tool 110 along the length of the tool.

This same orientation is maintained for any number of different tool diameters. For any given tool, the jaw members 146 need merely to be retracted to a separation distance greater than the diameter of the tool and, after insertion of the tool, the jaw members 146 are advanced to clamp the sides thereof.

Figure 9:
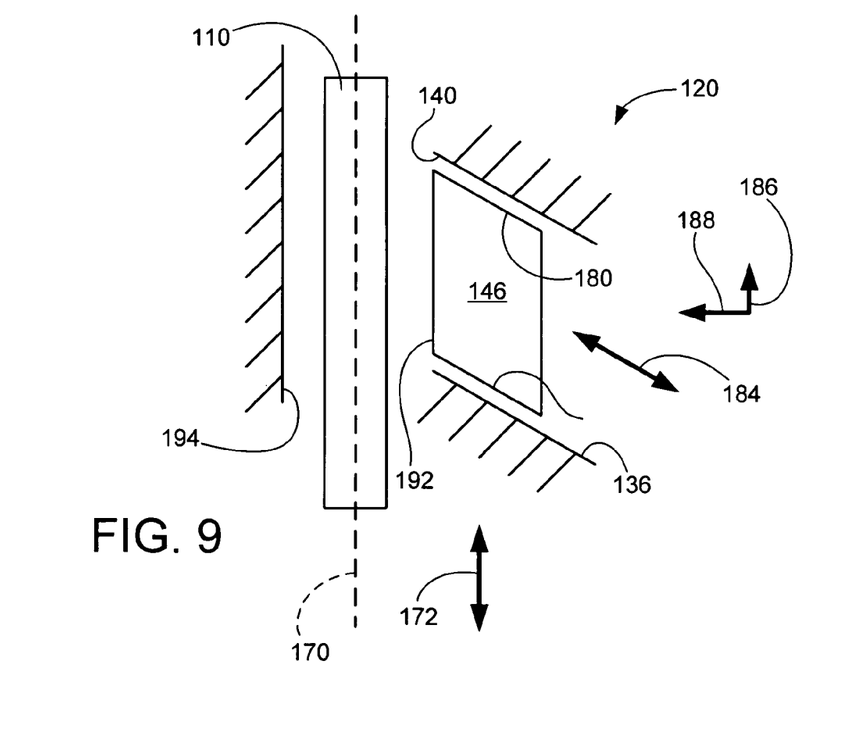
FIG. 9 provides a generalized schematic representation of relevant operation of an alternative embodiment which utilizes a single moveable jaw.

FIG. 9 provides a simplified schematic diagram for an alternative preferred embodiment for an end effector 120 in which a single jaw member 146 is used in conjunction with a stationary clamping surface 194. The single jaw member 146 operates as before to move in direction 184 to clamp the tool 110 between the respective surfaces 192, 194.

Figure 10:
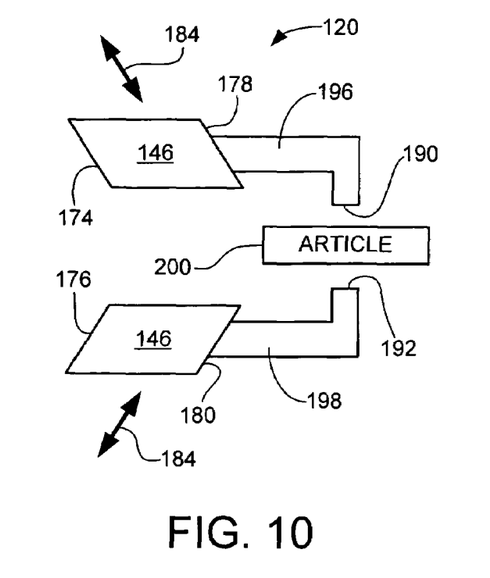
FIG. 10 generally illustrates another preferred end effector arrangement.

Preferably, the clamping surfaces 190, 192 of the jaw members 146 are disposed between the respective inclined surfaces 174, 178 and 176, 180, as this has been found to provide substantially uniform clamping force along the lengths of the clamping surfaces 190, 192. However, FIG. 10 shows an alternative preferred embodiment in which the clamping surfaces 190, 192 are supported by arms 196, 198 which extend beyond the upper inclined surfaces 178, 180. The clamp surfaces 190, 192 advance as described above to clamp an article 200 (which can be the tool 110, or other type of device).

Figure 11:
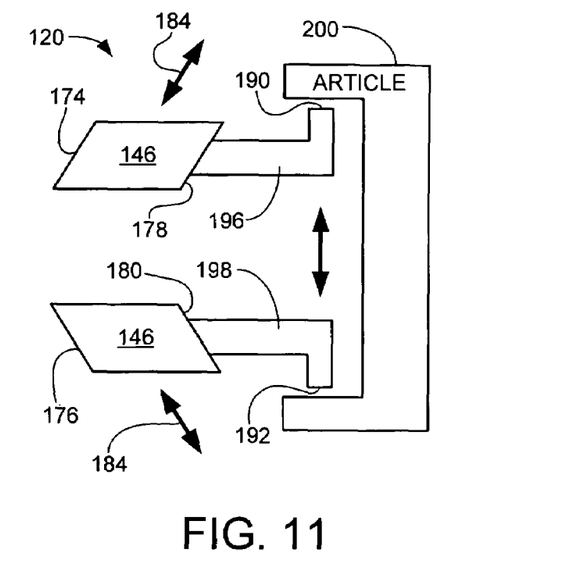
FIG. 11 generally illustrates yet another preferred end effector arrangement.

FIG. 11 demonstrates that the inclined surfaces 174, 178 and 176, 180 can be reversed as compared to FIG. 10, and that the clamping surfaces 190, 192 can move away from the central axis to clamp the article 200.

Figure 12:
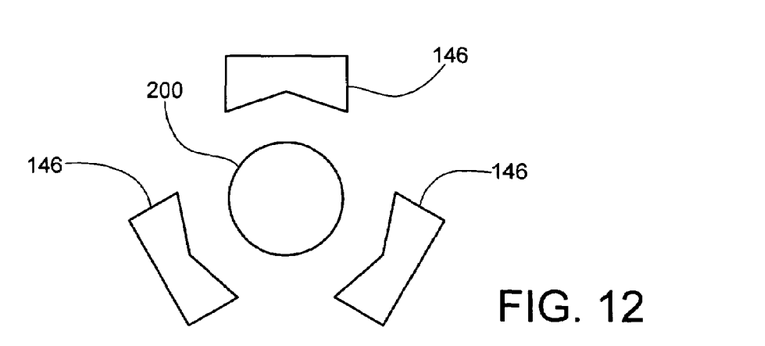
FIG. 12 provides an end view representation of another end effector arrangement that utilizes more than two jaw members.

FIG. 12 provides an end view representation of an end effector 120 in which more than two jaw members 146 are radially aligned about the central axis (in this case, three jaw members 146 are shown). Preferably, the jaw members 146 are evenly spaced about the circumference of the article 200.

Figure 13:
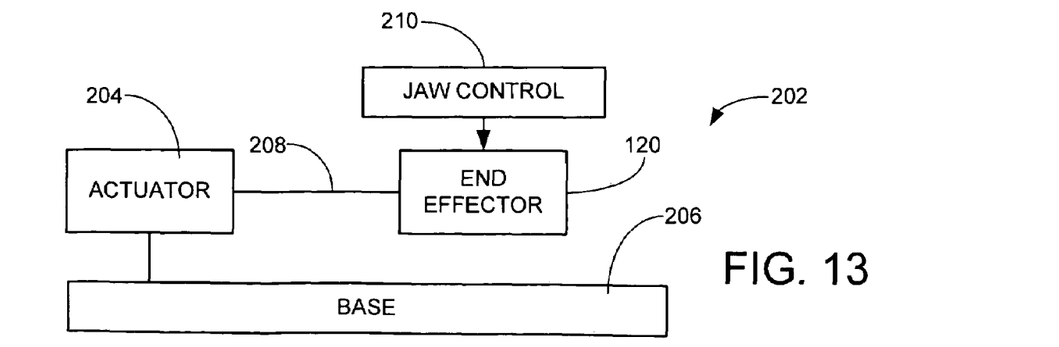
FIG. 13 is a functional block diagram of a robotic arm system that incorporates an end effector in accordance with a preferred embodiment.

FIG. 13 shows a functional block diagram for a system 202 which incorporates an end effector 120 in accordance with the various preferred embodiments described above. The system 202 includes an actuator assembly 204 which is supported by a stationary base 206. The actuator assembly 204 supports a robotic arm 208 which is configured for automated movement by the actuator assembly along multiple axes.

The end effector 120 is supported at a distal end of the arm 208. A jaw control block 210 is coupled to the end effector 120 to provide the requisite advancement force to move the jaw member(s) 146 as desired. The jaw control block 210 can use a threaded screw arrangement as shown previously in FIG. 6, but can alternatively comprise a pneumatic or hydraulic actuator, piezoelectric actuator, linear actuator, etc.

The various preferred embodiments discussed herein provide notable advantages over the prior art. The moveable jaw member(s) allows controlled movement of the clamping surface(s) in order to reliably and securely grasp the article at an angle and rate of advancement generally determined by the angle of the inclined surfaces. The clamping force is also improved and better distributed along the article, particularly for embodiments in which the clamping surface on each jaw is disposed between the respective guide surfaces.

While preferred embodiments have generally been directed to manipulating a cutting tool (drill bit 110) for a sharpening operation, it will be readily apparent that the moveable jaw member(s) as embodied herein can be advantageously utilized in any number of end effector applications, such as automated manufacturing operations in which component parts are picked and placed onto an assembly.

In view of the foregoing, it will now be understood that preferred embodiments of the present invention are generally directed to an apparatus (such as 120) for manipulating an article (such as 110, 200), such as a cutting tool.

The apparatus preferably comprises a jaw member (such as 146) configured to apply a gripping force to the article. The jaw member is disposed in a selected angular alignment with a central axis (such as 170) and comprises respective proximal and distal ends, a first inclined surface (such as 174, 176) adjacent said proximal end and a second inclined surface (such as 178, 180) adjacent said distal end, the second inclined surface substantially parallel to the first inclined surface and non-parallel to the central axis.

A support structure (such as 132) preferably comprises a first guide surface (such as 134, 136) in contact with the first inclined surface and a second guide surface (such as 138, 140) in contact with the second inclined surface. Relative movement of the jaw member with respect to the support structure induces respective movement of the first inclined surface along the first guide surface and respective movement of the second inclined surface along the second guide surface so that the jaw member remains in said selected angular alignment with the central axis while advancing in a direction orthogonal to the central axis (such as 188).

Figure 7:
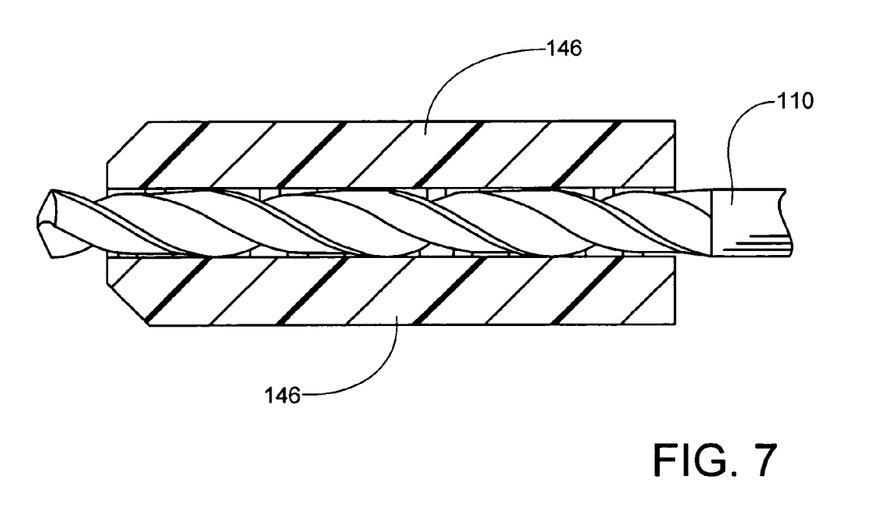
FIG. 7 provides a cross-sectional representation of the opposing jaws of FIG. 6 in conjunction with the tool of FIG. 2.

Preferably, the apparatus further comprises a second jaw member nominally identical to the first jaw member and configured to apply a gripping force to the article on a side of the article opposite the first jaw member, the second jaw member comprising respective inclined surfaces which cooperate with corresponding guide surfaces of the support structure so that the first and second jaw members operate in tandem to grippingly engage the article (see e.g., FIG. 7).

Preferably, a spring (such as 162) is disposed between the first and second jaw members to apply a biasing force therebetween to resist movement of the first jaw member toward the second jaw member. Each jaw member further preferably comprises a clamping surface (such as 154, 190, 192) configured to contactingly engage a side of the article, with the clamping surface preferably disposed between the first and second inclined surfaces (such as FIGS. 8 and 9).

In further preferred embodiments, the support structure is supported by a first housing member (such as 122) in which the jaw member is disposed, and the apparatus further comprises a second housing member (such as 164) configured to advance in relation to the first housing member in a direction substantially parallel to the central axis.

The second housing member preferably includes a base surface (such as 166) which contactingly engages the jaw member to advance the jaw member with respect to the first housing member, and an external grip surface (such as 168) configured to facilitate rotation of the second housing member with respect to the first housing member by a user.

Those skilled in the art will recognize that any given direction of movement can be expressed as a sum of respective component movements along orthogonal coordinate axes (e.g., see vector 184, which comprises a sum of vectors 186 and 188). Thus, reference in the claims to movement in a given direction will be clearly understood in accordance with the foregoing discussion to encompass such components.

For purposes of the appended claims, the recited "first means" will be understood consistent with the foregoing discussion to correspond to the disclosed guide surfaces 134, 136, 178, 180 and the corresponding inclined surfaces 174, 176, 178, 180 at opposing proximal ends of the respective jaw members 146, as shown in FIGS. 4-11. The first means does not extend to the prior art chuck assembly 108 of FIG. 1, and this prior art structure is expressly excluded from the definition of an equivalent.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular environment without departing from the spirit and scope of the present invention.

In addition, although the embodiments described herein are generally directed to a sharpening system for sharpening drill bits, it will be appreciated by those skilled in the art that the claimed subject matter is not so limited and various other applications can be utilized without departing from the spirit and scope of the claimed invention.

What is claimed is:

1. An apparatus comprising:
    a jaw member configured to apply a gripping force to an article, the jaw member disposed in a selected angular alignment with a central axis and comprising respective proximal and distal ends, a first inclined surface adjacent said proximal end and a second inclined surface adjacent said distal end, the second inclined surface substantially parallel to the first inclined surface and non-parallel to the central axis, wherein the first and second inclined surfaces face away from the central axis in a common direction; and
    a support structure comprising a first guide surface in contact with the first inclined surface and a second guide surface in contact with the second inclined surface, wherein relative movement of the jaw member with respect to the support structure induces respective movement of the first inclined surface along the first guide surface and respective movement of the second inclined surface along the second guide surface so that the jaw member remains in said selected angular alignment with the central axis while advancing in a direction orthogonal to the central axis.

2. The apparatus of claim 1, wherein the jaw member is characterized as a first jaw member, and wherein the apparatus further comprises a second jaw member configured to apply a gripping force to the article on a side of the article opposite the first jaw member, the second jaw member comprising respective inclined surfaces which cooperate with corresponding guide surfaces of the support structure so that the first and second jaw members operate in tandem to grippingly engage the article.

3. The apparatus of claim 2, further comprising a spring disposed between the first and second jaw members to apply a biasing force therebetween to resist movement of the first jaw member toward the second jaw member.

4. The apparatus of claim 1, wherein the jaw member further comprises a clamping surface configured to contactingly engage a side of the article.

5. The apparatus of claim 4, wherein the clamping surface is disposed on the jaw member between the first and second inclined surfaces.

6. The apparatus of claim 4, wherein the clamping surface has a substantially v-shaped cross-sectional shape.

7. The apparatus of claim 1, wherein the support structure is supported by a first housing member in which the jaw member is disposed, and wherein the apparatus further comprises a second housing member configured to advance in relation to the first housing member in a direction substantially parallel to the central axis.

8. The apparatus of claim 1, wherein the second housing member includes a base surface which contactingly engages the jaw member to advance the jaw member with respect to the first housing member.

9. The apparatus of claim 8, wherein the second housing member threadingly engages the first housing member, and includes an external grip surface configured to facilitate rotation of the second housing member with respect to the first housing member by a user.

10. The apparatus of claim 1, characterized as a chuck assembly configured to support a cutting tool for presentation of a distal end of the tool against an abrasive member.

11. An apparatus comprising:
    a housing comprising a central axis extending therethrough, a first guide surface and a second guide surface parallel to the first guide surface, wherein the first and second guide surfaces face in a common direction toward the central axis at a non-orthogonal angle therewith; and
    a moveable jaw member disposed within the housing and configured to apply a gripping force to an article aligned along the central axis, the jaw member comprising a first inclined surface at a proximal end of the jaw member and a laterally extending guide flange disposed at a distal end of the jaw member with a second inclined surface parallel to the first inclined surface, wherein the first and second inclined surfaces face in a common direction away from the central axis at said non-orthogonal angle and are adapted to respectively slidingly contact the first and second guide surfaces as the jaw member is advanced toward the central axis.

12. The apparatus of claim 11, wherein the housing comprises an outer circumferentially extending portion and an interior guide plate which spans said outer circumferentially extending portion adjacent to the central axis in non-intersecting relation therewith, wherein the second guide surface is characterized as a distal edge surface of the guide plate.

13. The apparatus of claim 11, further comprising a spring which applies a biasing force against the jaw member in a direction orthogonal to the central axis to resist advancement of the jaw member in a direction parallel to the central axis.

14. The apparatus of claim 11, characterized as a chuck assembly adapted to secure a twist drill bit, wherein the twist drill bit extends along the central axis of the housing so that a proximal end of the twist drill bit extends through a first end of the housing and a distal end of the twist drill bit extends through an opposing second end of the housing.

15. An apparatus comprising:
a housing adapted to receive an article aligned along a central axis of the housing; and
opposing first and second jaw members disposed within the housing configured to concurrently advance toward the central axis on opposite sides thereof to apply a gripping force upon the article, wherein the first jaw member contactingly slides along respective first and second guide surfaces of the housing, the first and second guide surfaces facing in a first common direction toward the central axis at a selected non-orthogonal angle therewith, and wherein the second jaw member concurrently contactingly slides along respective third and fourth guide surfaces of the housing, the third and fourth guide surfaces facing in a second common direction toward the central axis at said selected non-orthogonal angle therewith.

16. The apparatus of claim 15, further comprising a spring disposed between the first and second jaw members to exert a biasing force therebetween in a direction orthogonal to the central axis to resist advancement of the first and second jaw members toward the central axis.

17. The apparatus of claim 15, further comprising an annular rotatable advancement mechanism coupled to the housing configured for rotation by a user to advance the first and second jaw members toward the central axis while the article is aligned along the central axis and extends through the advancement mechanism.

18. The apparatus of claim 15, characterized as a chuck assembly adapted to secure a twist drill bit, wherein the twist drill bit extends along the central axis of the housing so that a proximal end of the twist drill bit extends through a first end of the housing and a distal end of the twist drill bit extends through an opposing second end of the housing.

\* \* \* \* \*

UNITED STATES PATENT AND TRADEMARK OFFICE
CERTIFICATE OF CORRECTION

PATENT NO. : 7,641,202 B1  Page 1 of 1
APPLICATION NO. : 11/244470
DATED : January 5, 2010
INVENTOR(S) : Daniel T. Dovel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 933 days.

Signed and Sealed this

Sixteenth Day of November, 2010

David J. Kappos
*Director of the United States Patent and Trademark Office*